G. RIEDLER.
RUNNER ATTACHING DEVICE FOR THE AXLES OF WAGONS.
APPLICATION FILED SEPT. 11, 1920.
1,418,829.
Patented June 6, 1922.
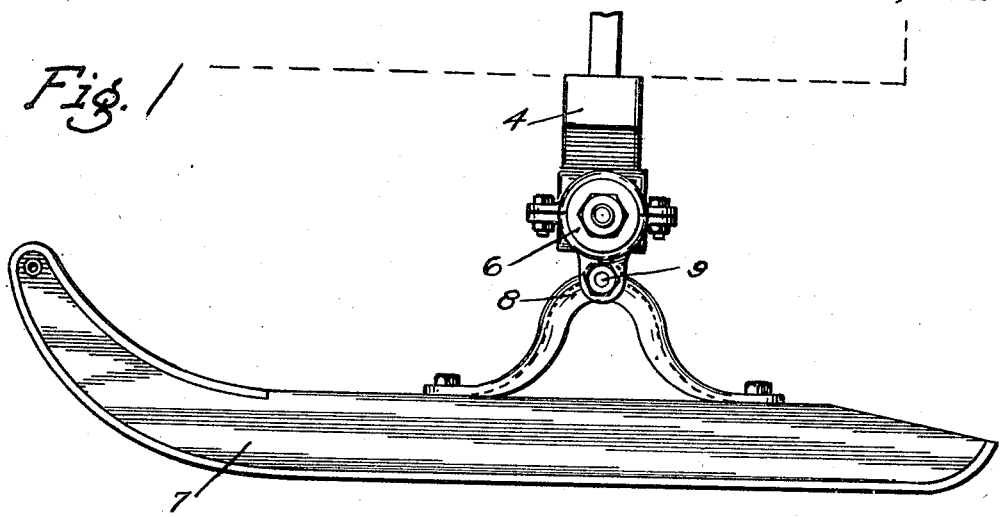
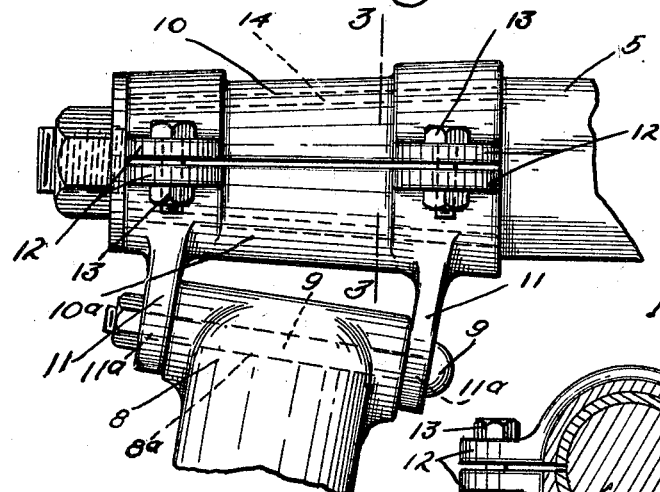
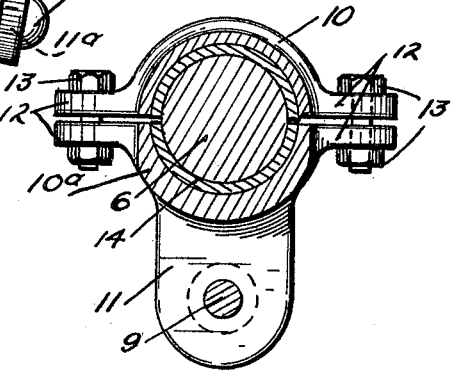
INVENTOR
Gottlieb Riedler
BY HIS ATTORNEYS
Williamson & Merchant

UNITED STATES PATENT OFFICE.

GOTTLIEB RIEDLER, OF HECTOR, MINNESOTA.

RUNNER-ATTACHING DEVICE FOR THE AXLES OF WAGONS.

1,418,829.  Specification of Letters Patent.  Patented June 6, 1922.

Application filed September 11, 1920. Serial No. 409,614.

*To all whom it may concern:*

Be it known that I, GOTTLIEB RIEDLER, a citizen of the United States, residing at Hector, in the county of Renville and State of Minnesota, have invented certain new and useful Improvements in Runner-Attaching Devices for the Axles of Wagons; and I do hereby declare the following to be a full, clear, and exact description of the invention, such as will enable others skilled in the art to which it appertains to make and use the same.

My invention has for its object to provide an extremely simple and efficient device for attaching runners to the axles of wagons, after substituting for the wheels, to convert the vehicle into a bob sled or sleigh.

Generally stated, the invention consists of the novel devices and combinations of devices hereinafter described and defined in the claim.

The difficulty with such runner attachments has been that either much trouble was required to detach or attach the device or that the attached device would injure the axle journal of the wagon and would be apt to work loose. My invention provides a frictionally rigid attachment which will not wear or damage the axle journal of the wagon.

The invention is illustrated in the accompanying drawings, wherein like characters refer to like parts throughout the several views.

Referring to said drawings:—

Fig. 1 is a view in side elevation of a runner attached to an axle journal of a wagon;

Fig. 2 is an enlarged view in rear elevation showing my hub sleeve attached to one end of the axle, the runner being removed; and Fig. 3 is a section on the line 3—3 of Fig. 2.

Of the parts of a wagon, the numeral 4 indicates the rear bolster, 5 the rear axle having the ordinary wheel journals 6. The numeral 7 indicates a rear runner having a knee bracket 8 provided at the top with a traverse eye 8ª, through which a nut-equipped bolt 9 is adapted to be passed.

A cast split hub sleeve is indicated by 10 and its lower split section 10ª. The same is provided with two laterally spaced depending lugs 11 having bolt eyes 11ª through which said bolt 9 may secure the said knee bracket of the runner 7 to said hub sleeve 10. These bolt eyes 11ª are canted in respect to each other, so that, when the knee bracket is attached by means of the bolt 9, the sides of the runner will also be canted outwardly. A pair of such canted runners will form an arched construction, and will hence have much strength to support a heavy load. The top of said knee bracket 8 fits closely between the lugs 11, so that, when attached with the bolt, it may oscillate freely on said bolt.

The split hub sleeve 10 has clamping lugs 12 on both its sections with eyes to fit clamping bolts 13 which, on both sides of said sleeve, clamp said sections together and secure the same frictionally and rigidly on the wheel journal 6. The axle burr engaging the threaded end of the journal or skein 6 is also screwed up tight against the outer ends of the split hub sleeve after the latter have been tightly clamped together about the journal, and the increased friction available therefrom co-operates with the clamping friction obtained by screwing up the bolts 13 connecting the half sections of the split hub to hold the split hub very rigidly connected to the journal. In other words, the split hub sleeve is so rigidly secured to the journal by the means above specified that there can be no oscillation of the hub sleeve on the journal, even under the heaviest strain to which the sled is ever subjected.

To protect the said journal 6, a soft babbitt inner lining 14 is fitted within both sections of the hub sleeve 10. This increases the rigidity of the said sleeve and also prevents scratching or damage to the axle journal 6.

It will be understood, of course, that there will be four attachable runners and that these are applied to the axle journals of the wagon when the wheels are removed. It is also evident that, with the above described device, runners may be quickly substituted for wagon wheels and vice versa, and that such runners may be rigidly secured to the said axle journals without wearing down or damaging the journal. The canted position of the runners, afforded by the arrangement of the depending lugs, enables the runners to withstand a heavy strain.

What I claim is:—

A runner device adapted to be attached to the journal of a wagon axle having in combination a split tapered sleeve adapted to be rigidly clamped to said journal, spaced lugs depending therefrom and provided with alined apertures, a pivot bolt disposed in said lugs, the axes of said apertures and bolt inclining downwardly and inwardly of the axle, and a runner having a knee bracket secured thereto, said bracket having an apertured bearing at its upper portion pivoted on said bolt between the said lugs, and forming the sole connection between the said axle and runner.

In testimony whereof I affix my signature in presence of two witnesses:

GOTTLIEB RIEDLER.

Witnesses:
 JOHN S. NELSON,
 H. C. ANDERSON.